(12) United States Patent
Kaneda et al.

(10) Patent No.: US 6,720,995 B1
(45) Date of Patent: Apr. 13, 2004

(54) OPTICAL APPARATUS WITH A VOLTAGE CONTROLLED VARIABLE DENSITY ELEMENT

(75) Inventors: Naoya Kaneda, Chigasaki (JP); Hidekage Sato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/033,253

(22) Filed: Mar. 2, 1998

(30) Foreign Application Priority Data

Mar. 6, 1997 (JP) .............................. 9-051716

(51) Int. Cl.7 ............................................. H04N 5/228
(52) U.S. Cl. ..................... 348/208.8; 348/363; 348/342
(58) Field of Search ..................... 348/208.99, 208.1, 348/208.2, 208.5, 208.6, 208.7, 208.8, 208.11, 208.12, 208.16, 219.1, 222.1, 224.1, 337, 338, 335, 340, 342, 363; 559/679; 396/272

(56) References Cited

U.S. PATENT DOCUMENTS

| | | | | |
|---|---|---|---|---|
| 4,624,547 A | * | 11/1986 | Endo et al. .................... 355/68 |
| 4,746,948 A | * | 5/1988 | Matsui ..................... 250/201.2 |
| 4,827,348 A | * | 5/1989 | Ernest et al. ............. 348/221.1 |
| 4,884,134 A | * | 11/1989 | Tsuji et al. ............... 348/230.1 |
| 4,887,108 A | * | 12/1989 | Taniguchi et al. ........... 396/257 |
| 4,949,110 A | * | 8/1990 | Taniguchi et al. ........... 396/257 |
| 5,015,057 A | * | 5/1991 | Rumbaugh et al. ..... 252/299.01 |
| 5,161,026 A | * | 11/1992 | Mabuchi et al. .......... 348/222.1 |
| 5,225,936 A | * | 7/1993 | Sugiura et al. .............. 359/676 |
| 5,450,163 A | * | 9/1995 | Iwasaki ....................... 396/234 |
| 5,459,542 A | * | 10/1995 | Fujiwara et al. ............... 396/55 |
| 5,517,243 A | * | 5/1996 | Kudo et al. .................. 348/296 |
| 5,764,292 A | * | 6/1998 | Yamaguchi .................. 348/363 |
| 5,907,353 A | * | 5/1999 | Okauchi ................... 348/218.1 |
| 5,953,546 A | * | 9/1999 | Okada et al. ................. 396/272 |
| 6,014,169 A | * | 1/2000 | Azusawa et al. ......... 348/208.8 |
| 6,035,133 A | * | 3/2000 | Shiomi ......................... 396/55 |
| 6,088,534 A | * | 7/2000 | Tominaga et al. ........... 396/449 |

FOREIGN PATENT DOCUMENTS

JP        5-80386       * 4/1993   .......... H04N/5/238

* cited by examiner

*Primary Examiner*—Tuan Ho
(74) *Attorney, Agent, or Firm*—Robin, Blecker & Daley

(57) ABSTRACT

An optical apparatus capable of performing an image-taking operation in a plurality of image-taking modes includes a selecting part for selecting one image-taking mode from among a plurality of image-taking modes, a variable density element, and a density control part for controlling density of the variable density element, wherein the density control part is capable of controlling the density of the variable density element in a plurality of density control modes and selects one of the plurality of density control modes according to the image-taking mode selected by the selecting part.

6 Claims, 14 Drawing Sheets

F I G. 2
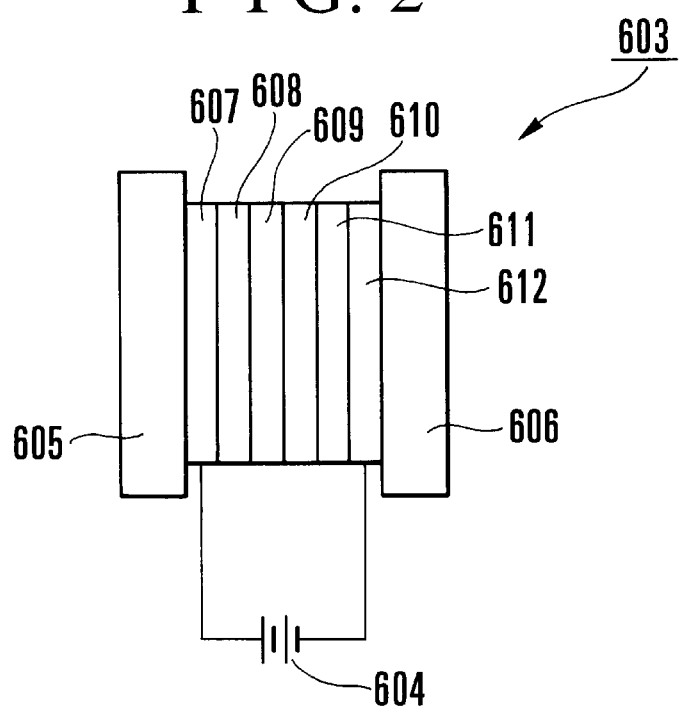
F I G. 3
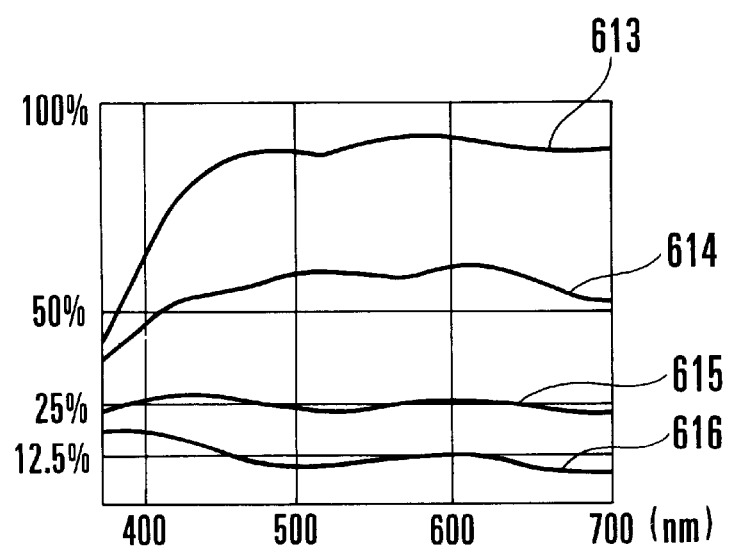

SHUTTER SPEED
ND STEP NUMBER

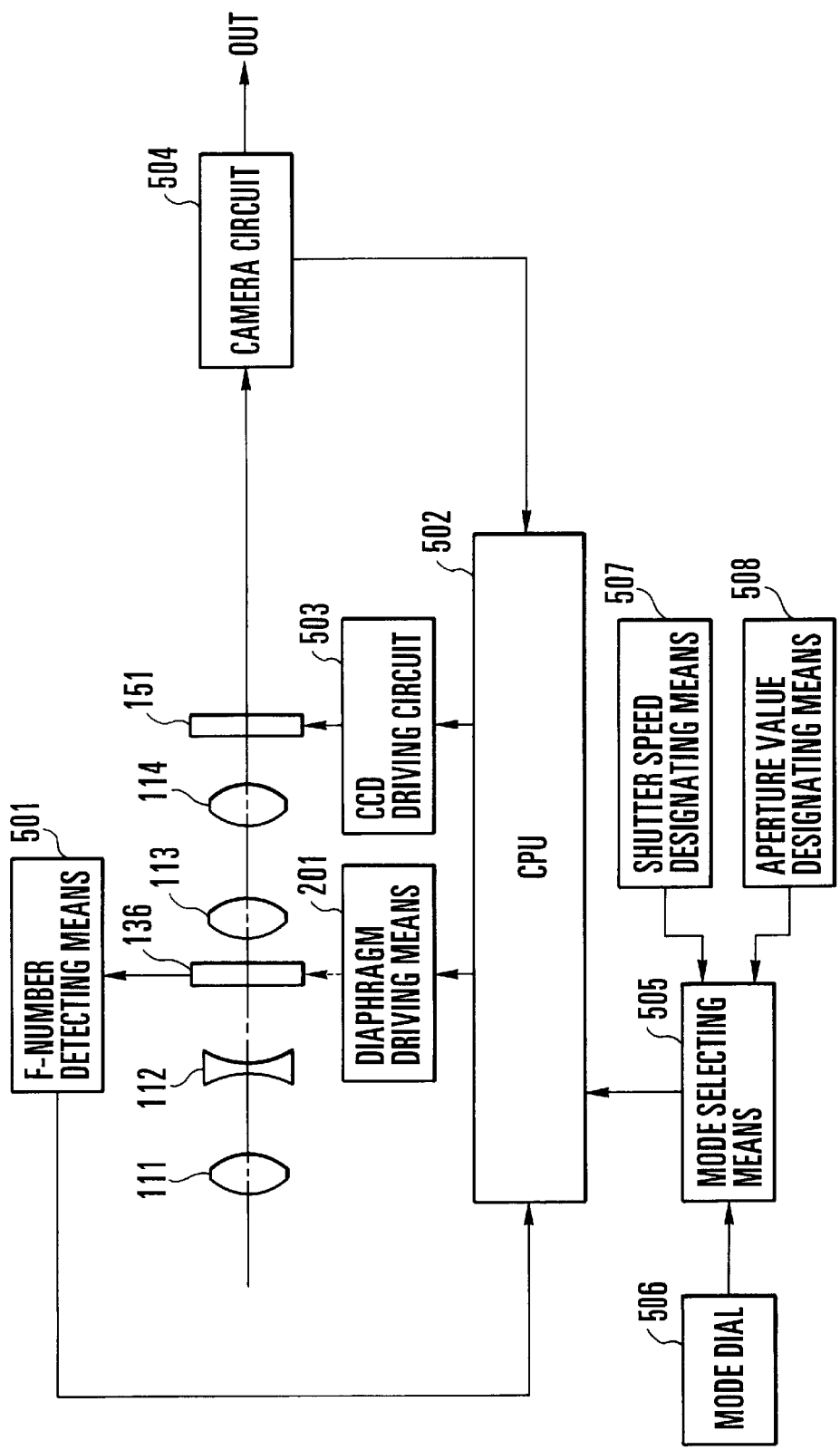

OPTICAL APPARATUS WITH A VOLTAGE CONTROLLED VARIABLE DENSITY ELEMENT

BACKGROUND OF THE INVENTION

1. Field of the Invention

The present invention relates to an optical apparatus such as a video camera, a still camera, a surveillance camera or the like.

2. Description of Related Art

Lens optical systems heretofore employed in the optical apparatuses of the above-stated kind are generally arranged, for example, as shown in FIG. 7. The lens optical system shown in FIG. 7 is a zoom lens composed of four lens groups with the fourth lens group which is in the rearmost position arranged to be movable for focusing in the direction of an optical axis. Referring to FIG. 7, the lens optical system includes a fixed front lens group 111, a variator lens group 112, a fixed lens group 113 and a focusing (compensator) lens group 114.

The lens optical system further includes a guide bar 133 provided for antirotation, a feed bar 134 arranged for moving the variator lens group 112, a fixed tube 135, a diaphragm unit 136 (inserted, in this case, perpendicular to the paper surface of the drawing), a stepping motor 137 employed as a focus motor, and an output shaft 138 of the stepping motor 137. The output shaft 138 is provided with a male screw 138a for moving the focusing lens group 114. The male screw 138a is in mesh with a female screw forming part 139 formed integrally with a moving frame 140 for moving the focusing lens group 114.

Guide bars 141 and 142 are arranged to guide the focusing lens group 114. A back plate 143 is arranged to position and retain the guide bars 141 and 142 in their positions. The optical system further includes a relay holder 144, a zoom motor 145, a speed reducer unit 146 arranged to reduce the speed of the zoom motor 145, and interlocking gears 147 and 148. The interlocking gear 148 is secured to the feed bar 134 for zooming.

The lens optical system shown in FIG. 7 operates as follows. When the stepping motor 137 is driven, the focusing lens group 114 is caused to move in the direction of the optical axis by screw feeding. When the zoom motor 145 is driven, the feed bar 134 is caused to rotate through the interlocking gears 147 and 148. The rotation of the feed bar 134 moves a lens frame 112a which is in screwed engagement with the feed bar 134, so that the variator lens group 112 held by the lens frame 112a is moved in the direction of the optical axis.

FIG. 8 shows by way of example the details of the diaphragm unit 136 used for the lens optical system. The diaphragm unit 136 is shown in FIG. 8 as viewed in the direction of the optical axis. Referring to FIG. 8, the diaphragm unit 136 includes an aperture part 208, a motor part 201, an output shaft (rotating shaft) 202, a diaphragm lever 203, projections 204 and 205 provided at the fore ends of the diaphragm lever 203, diaphragm blades 206 and 207, a diaphragm body 209, and guide parts 210 to 213 arranged to guide the diaphragm blades 206 and 207. The fore end projections 204 and 205 are inserted respectively into slots provided in the diaphragm blades 206 and 207. The diaphragm blades 206 and 207 are thus interlocked with the diaphragm lever 205. The aperture part 208 is formed jointly by the diaphragm blades 206 and 207. When the output shaft 202 rotates, the diaphragm blades 206 and 207 move upward and downward in opposite directions, as viewed in the drawing (the blade 207 moves downward while the blade 206 moves upward). The motions of the diaphragm blades 206 and 207 cause the size of the aperture of the aperture part 208 to vary accordingly. The motor part 201 serving as a drive source is mounted on the diaphragm body 209. The diaphragm body 209 is provided with the guide parts 210 to 213.

FIG. 9 shows in detail the structure of the motor part 201 of the diaphragm unit 136. A turning force is obtained by an ordinary known motor structure composed of a rotor magnet 215, coils 216 and 217 and a yoke (case) 214. The motor part 201 is also provided with a Hall element 218 for detecting the rotation of the motor part 201.

In addition to light quantity control by means of the diaphragm unit arranged as described above, a video camera or the like can perform light quantity control by the so-called shutter speed control means for controlling an electric charge storing time of an image sensor (CCD). FIG. 10(a) shows the electric charge storing time in relation to the field period of a television signal. In the case of the NTSC system, one field period which corresponds to 1/60 sec is set to the electric charge storing time in its entirety. The lowest shutter speed is normally 1/60 sec. The electric charge storing time can be shortened for a higher shutter speed, as shown in FIG. 10(b).

FIG. 11 shows in a block diagram a light quantity control arrangement conventionally adopted for a video camera. Referring to FIG. 11, a zoom lens is composed of lens groups 111 to 114 in the same manner as in the case of FIG. 7. A diaphragm unit 136 is arranged as shown in FIGS. 8 and 9. However, the diaphragm unit 136 is not limited to the arrangement having two diaphragm blades as in the case of FIGS. 8 and 9. An iris diaphragm which has more than two blades may be used for the diaphragm unit 136. A CCD 151 is employed as an image sensor. F-number detecting means 501 is generally arranged to detect the absolute rotating position of a rotor of the diaphragm unit 136 by means of a Hall element as shown in FIG. 9. A CPU 502 is arranged to control a driving action of each light quantity adjusting means in accordance with each program diagram which will be described later herein. The video camera shown in FIG. 11 further includes a CCD driving circuit 503, a camera circuit 504, a mode selecting means 505, a mode dial 506, a shutter speed designating means 507 and an aperture value designating means 508.

The camera circuit 504 is arranged to perform signal processing actions of varied kinds, such as an amplifying process, a gamma correction process, etc. Among the signals processed, a luminance signal is taken into the CPU 502. With the luminance signal taken in the CPU 502, the level of the luminance signal is checked to find whether the light quantity is apposite (a correct-exposure light quantity), or excessive (an over-exposure light quantity) or insufficient (an under-exposure light quantity). The CPU 502 then adjusts the light quantity according to the result of the check. For the light quantity adjustment, it is conceivable to control and adjust the diaphragm aperture diameter at the diaphragm unit 136 and the electric charge storing time, i.e., a shutter speed, at the CCD 151, as mentioned in the foregoing. Further, in a case where the light quantity is still insufficient, i.e., an under-exposure light quantity, with the diaphragm unit 136 fully opened to its maximum aperture position and the shutter speed set at its lowest speed, it is generally practiced to increase the gain of the video signal (a gain-up action) at the camera circuit 504. At the time of such light quantity adjustment, when the mode dial 506 is operated by the operator to select one of shooting (image-taking) modes of various kinds called an automatic mode, a sport mode, a portrait mode, etc., the manner of the light quantity adjustment, i.e., a program line, is changed according to the shooting mode thus selected. Further, when the mode dial 506 is set at a position for a manual mode, a value designated by the shutter speed designating means 507 or the aperture value designating means 508 is transmitted through the mode selecting means 505 to the CPU 502.

FIG. 12 shows combinations of aperture values and shutter speeds by which optimum light quantities can be obtained for different object luminances according to the shooting mode selected. Incidentally, the relation between the illuminance (luminance) and an exposure value EV cannot be exactly determined without having a value SV which corresponds to the film sensitivity of a silver-halide film. However, the graph of FIG. 12 and other graphs used for description hereinafter are set on the basis of the sensitivity of ordinary video cameras.

Referring to FIG. 12, a line which connects solid circles (●) represents a maximum aperture priority program line. In the maximum aperture priority program line, the shutter speed is first increased accordingly as the luminance becomes brighter from a state of having EV7, 1/60 sec and F1.4. In the case of FIG. 12, the upper limit of the shutter speed is set at 1/1000 sec. The upper limit, however, may be set at a shutter speed higher than 1/1000 sec. However, if the shutter speed is excessively high, the instability of a frequently moving object image would increase. The upper limit of the shutter speed is, therefore, preferably set according to the purpose of shooting. According to the program line connecting the solid circles (●), after the luminance becomes brighter than EV11, the diaphragm unit 136 is driven so as to obtain an optimum light quantity. The program line connecting the solid circles (●) is used for the case where the depth of field is to be made as shallow as possible so as to emphasize a blurring effect, for example, in the case of the portrait mode. Next, a program line which connects hollow triangles (Δ) is used for the case where the so-called "automatic" mode is set. In the case of FIG. 12, the program line for the automatic mode is arranged to perform light quantity control by driving the diaphragm unit 136 at exposure values between EV7 and EV12 and between EV16 and EV18 and by varying the shutter speed at exposure values between EV12 and EV16. This is because, in a case where the quality of image would be deteriorated by the diffraction of light to show flare with the modulation transfer function (MTF) lowered, if the aperture diameter is smaller than the diameter indicated by F8, for example, this program line is often provided for minimizing the adverse effect of image deterioration due to diffraction. Although the F-number in question is set at F8 in this case, this F-number varies with the size of image, the focal length of the lens optical system, etc.

A program line connecting hollow squares (□) is arranged to be used for the case where a shutter speed of 1/250 sec is to be used as much as possible. This program line applies to cases where the shutter speed of 1/250 sec is selected under such light quantity control that gives priority to a shutter speed or where some high shutter speed is to be frequently used, like in the so-called sport mode.

It is a recent trend to use a smaller CCD, which causes the above-stated diffraction incurring F-number to shift to a brighter F-number, i.e., a smaller F-number, and to have a smaller image size, which causes the focal length to become shorter in obtaining the same angle of view and, as a result, causes the depth of field to become deeper to make it difficult to obtain an image of a shallow depth of field. Besides, the CCDs have recently come to have a higher degree of sensitivity. Therefore, the range of conditions obtainable according to the above-stated light quantity control methods of the prior art for obtaining images with desired effects, such as a blurring effect, has come to be limited.

For example, with the portrait mode obtained by the program line connecting the solid circles (●), the diaphragm cannot be kept at its maximum (full-open) aperture position for an ordinary outdoor scene to which an exposure value between EV12 and EV15 applies.

BRIEF SUMMARY OF THE INVENTION

The invention is directed to the solution of the above-stated problem of the prior art.

To attain the above-stated object, in accordance with one aspect of the invention, there is provided an optical apparatus, which comprises selecting means for selecting one image-taking mode from among a plurality of image-taking modes, a variable density element, and density control means for controlling density of the variable density element, wherein the density control means is capable of controlling the density of the variable density element in a plurality of density control modes and selects one of the plurality of density control modes according to the image-taking mode selected by the selecting means.

In accordance with another aspect of the invention, there is provided an optical apparatus, which comprises selecting means for selecting one image-taking mode from among a plurality of image-taking modes, a variable density element, density control means for controlling density of the variable density element in a plurality of density control modes, light quantity adjusting means for adjusting the quantity of passing light by moving diaphragm blades in a plurality of light quantity adjusting modes, and deciding means for deciding a combination of the density control mode of the density control means and the light quantity adjusting mode of the light quantity adjusting means according to the image-taking mode selected by the selecting means.

The above and other aspects and features of the invention will become apparent from the following detailed description of preferred embodiments thereof taken in connection with the accompanying drawings.

BRIEF DESCRIPTION OF THE SEVERAL VIEWS OF THE DRAWING

FIG. 2 shows in detail the structural arrangement of a variable density element.

FIG. 3 is a graph for explaining spectral transmittance of the variable density element.

FIG. 11 is a block diagram showing the light quantity control arrangement of the conventional optical apparatus.

DETAILED DESCRIPTION OF THE INVENTION

Hereinafter, preferred embodiments of the invention will be described in detail with reference to the drawings.

First Embodiment

Figure 1:
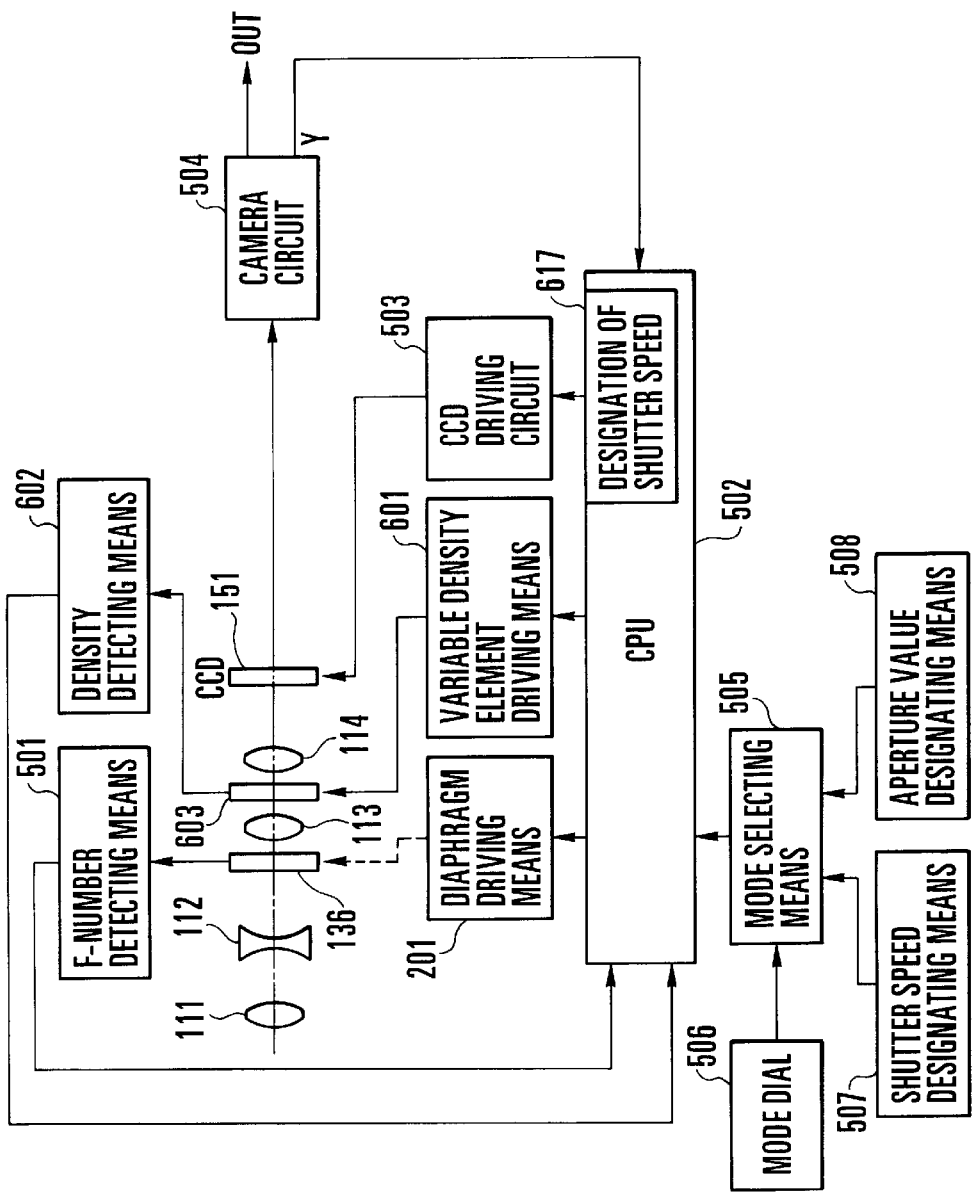
FIG. 1 is a block diagram showing an optical apparatus according to a first embodiment of the invention.

FIGS. 1 to 6 relate to an optical apparatus according to a first embodiment of the invention. FIG. 1 is a block diagram of the optical apparatus according to the first embodiment. Referring to FIG. 1, a zoom lens is composed of four lens groups 111 to 114 in the same manner as in the conventional arrangement shown in FIG. 11 and described in the foregoing. The optical apparatus includes a diaphragm unit 136, a CCD 151 and a variable density element 603. The variable density element 603 is capable of varying its density (the quantity of transmitted light) while nearly keeping the ND (neutral density, i.e., constant spectral transmittance) characteristic, and is, for example, an electrochromic element disclosed in Japanese Laid-Open Patent Application No. HEI 5-80386. F-number detecting means 501 which is included in the diaphragm unit 136 is composed of a Hall element or the like. Density detecting means 602 is a sensor provided for keeping the density of the variable density element 603 at a target density by feedback control. The density detecting means 602 is, for example, composed of a light emitting element such as an IRED or the like and a light receiving element which are disposed across the variable density element 603. The density of the variable density element 603 is thus arranged to be detected through the output of the light receiving element. A CPU 502 is arranged to preside light quantity control as in the case of the prior art example described in the foregoing. Blocks 503, 504, 201 and 505 to 508 are arranged in the same manner as in the case of the conventional arrangement described in the foregoing with reference to FIG. 11. Variable density element driving means 601 is arranged to apply a voltage between the two poles of the variable density element 603 so as to vary the density of the variable density element 603. The density varying direction, i.e., whether the density shifts to a darker (higher density) density or to a brighter (lower density) density, is determined by the direction in which the voltage is applied. As apparent from the block diagram of FIG. 1, in the first embodiment, the CPU 502 is arranged to be capable of carrying out light quantity control not only through the shutter speed and the diaphragm unit 136 but also by means of the variable density element 603, according to the output of the mode selecting means 505 which is associated with the operation of an operator.

FIG. 2 shows the structural arrangement of the variable density element 603. The variable density element 603 includes glass plates 605 and 606, and layers 607 to 612 formed by a vapor deposition process and arranged between the glass plates 605 and 606 to perform a density varying function. These layers are a transparent electrode 607, a deoxidization color forming layer 608, an electrolyte layer 609, a blocking layer 610, an oxidation color forming layer 611, and a transparent electrode 612. Coloring and decoloring actions are carried out by applying a voltage of a power supply 604 between the transparent electrodes 607 and 612.

In FIG. 3, lines 613 to 616 represent spectral transmittances obtained at different density level steps when coloring and decoloring actions are performed by the above-stated variable density element 603.

Figure 4:
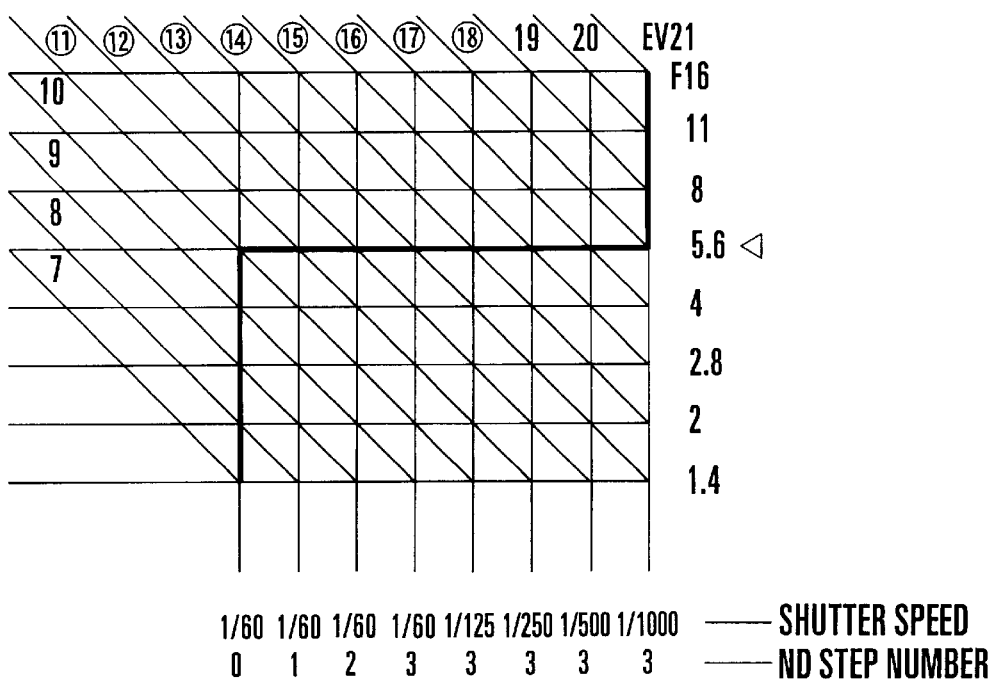
FIG. 4 shows a program diagram in the optical apparatus in the first embodiment.
Figure 5:
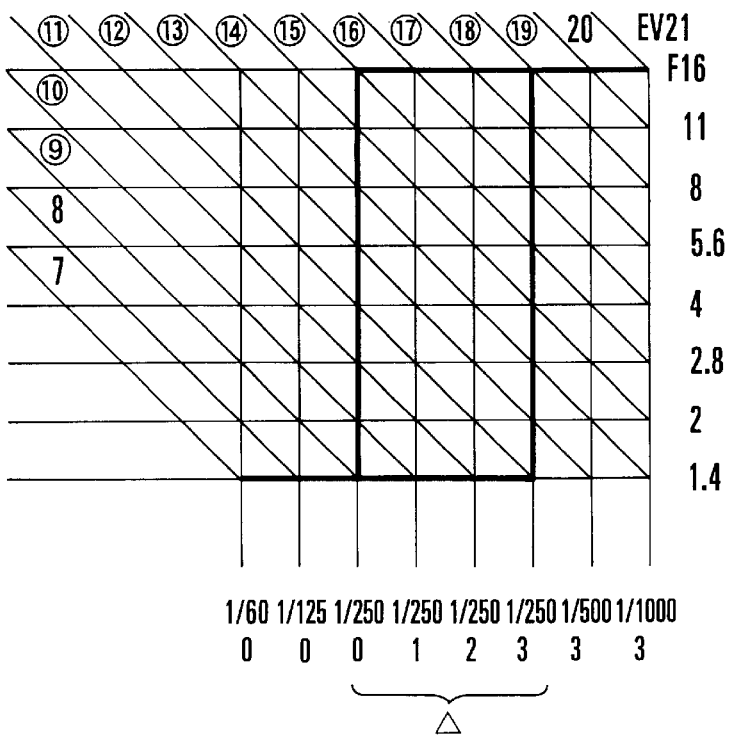
FIG. 5 shows another program diagram in the optical apparatus in the first embodiment.
Figure 6:
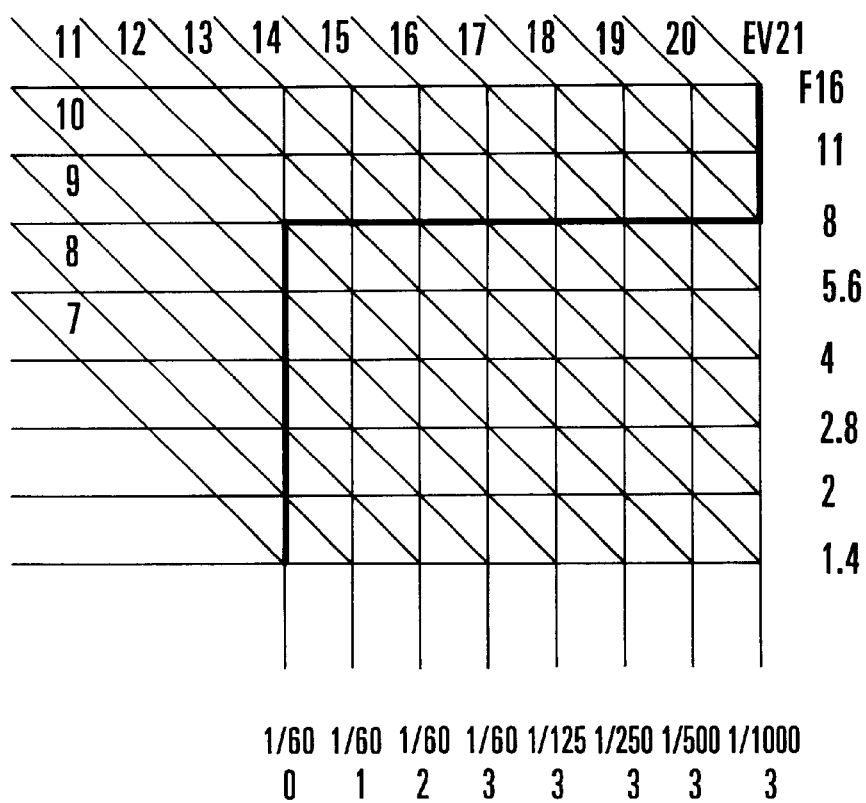
FIG. 6 shows a further program diagram in the optical apparatus in the first embodiment.
Figure 7:
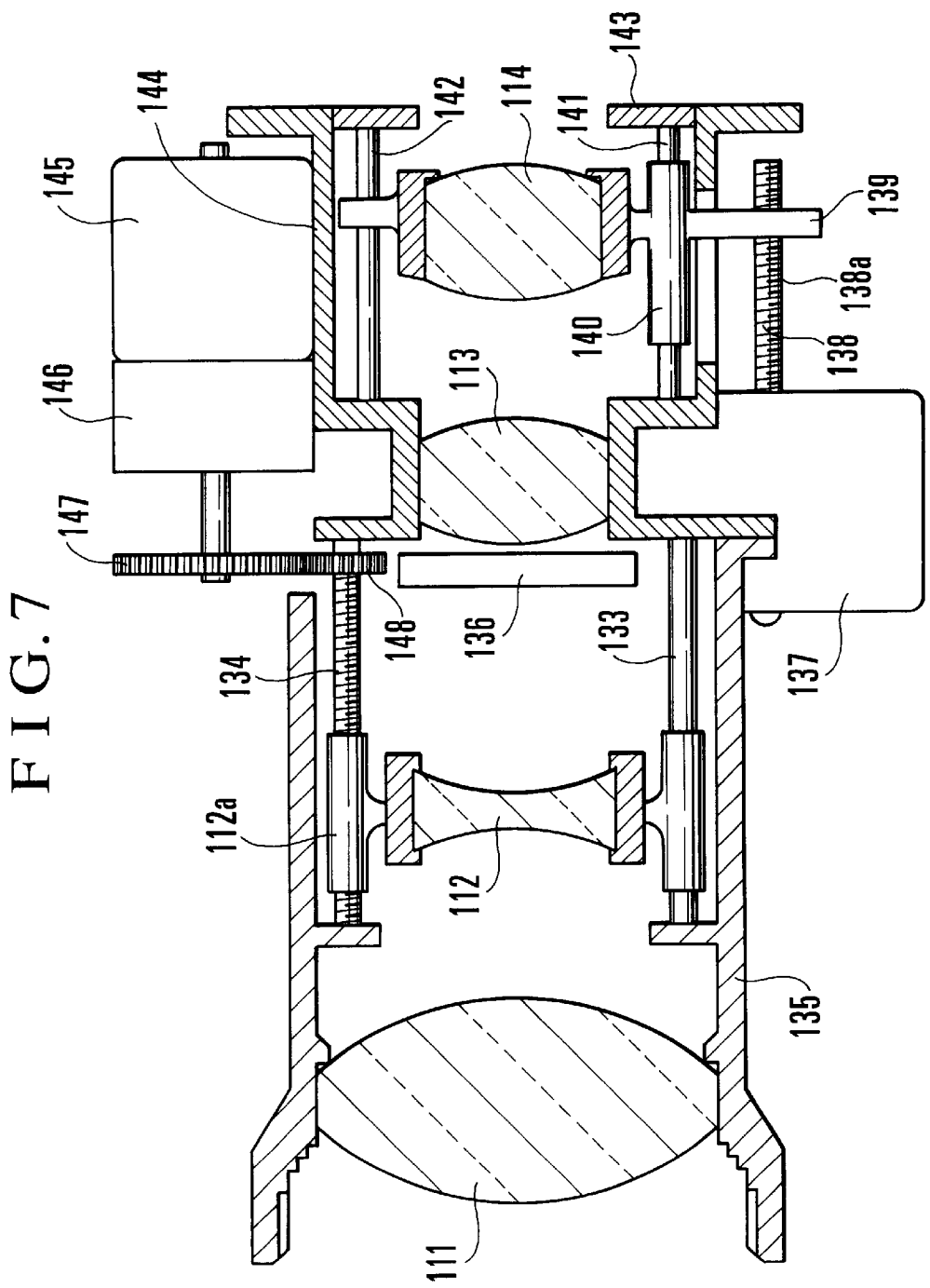
FIG. 7 is a sectional view showing a lens optical system used in the conventional optical apparatus.

With the variable density element 603 which is arranged as shown in FIGS. 2 and 3 disposed in the optical apparatus shown in FIG. 1, program diagrams to be used for each of different image-taking modes are shown by way of example in FIGS. 4, 5 and 6. These program diagrams are prepared on the assumption that the operating steps of the variable density element 603 are controllable from step "0" up to step "3". The step "0" is assumed to be perfectly transparent. The quantity of transmitted light is assumed to be 50% at the step "1", to be 25% at the step "2" and to be 12.5% at the step "3".

FIG. 4 shows by way of example a program diagram to be used when a mode of giving priority to an aperture value of F5.6 is selected. According to this program diagram, the desired F-number can be obtained over a wide range of exposure values from EV11 to EV18. Specifically, at the exposure value of EV11, the shutter speed is 1/60 sec for the aperture value of F5.6. For the exposure value of EV12, the density is increased by one step (50%) at the variable density element 603. An optimum light quantity, of course, can be obtained for an exposure between these exposure values by controlling the density of the variable density element 603 in an analog manner. After that, the light quantity is controlled further by means of the variable density element 603, with the condition of 1/60 sec and F5.6 left unchanged, for up to the exposure value of EV14. When the object luminance comes to exceed a luminance corresponding to the exposure value of EV14, the light quantity is controlled by varying the shutter speed while fixing the variable density element 603 at the step "3" (12.5%). Further, the light quantity can be adjusted in a natural manner by setting the steps of control over the above-stated electric charge storing time of the CCD much more finely than the shutter speed series of cameras "1/60→1/125→1/250→1/500 sec". Further, although the mode of giving priority to the aperture value of F5.6 is selected in the case of this example, the optical apparatus can be set at an aperture value other than F5.6 if the exposure value becomes smaller than EV11 or larger than EV18. If such aperture value setting is not acceptable to the operator, the embodiment may be arranged either to give some warning or to increase the gain of the CCD without changing the aperture value of F5.6 for exposure values of EV7 and less. Further, in order to keep the aperture value at F5.6, the light quantity is adjusted first by means of the variable density element 603 for brighter luminances (exposure values) and, when the adjusted density reaches its maximum density (the step "3" in this case), the shutter speed (the electric charge storing time) is then varied. However, it is of course possible to change the sequence of the density varying action and the shutter speed varying action or to combine these actions with each other in a more complex manner.

FIG. 5 shows a program diagram which applies to a case where a mode of giving priority to the shutter speed of 1/250 sec is selected. In FIG. 5, the program diagram includes two program lines. When the object luminance increases from a luminance corresponding to the exposure value of EV9, the light quantity control is performed either first with the aperture value, according to one of the two program lines, or first with the density of the variable density element 603 according to the other program line.

However, for the above-stated process, the light quantity control may be carried out by using both the diaphragm unit 136 and the variable density element 603 in combination with each other.

Figure 12:
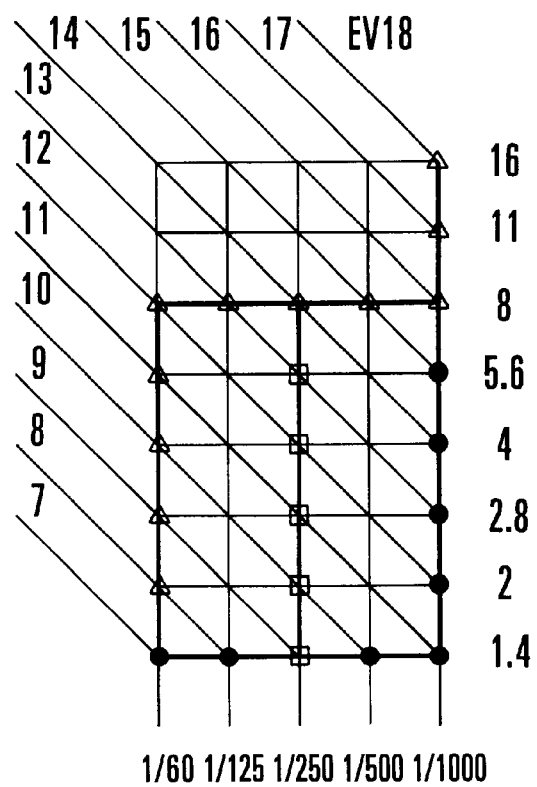
FIG. 12 shows a program diagram in the conventional optical apparatus.

FIG. 6 shows a program diagram which applies to the case of the so-called "automatic mode" and which is to be contrasted with the program line connecting the hollow triangles (Δ) shown in FIG. 12. As apparent from comparison of FIGS. 6 and 12, with the F-number at which the diffraction takes place assumed to be F8 and above, the deterioration of an image might take place only at the exposure value of EV19 and above in the first embodiment, while it tends to take place at the exposure value of EV16 and above in the case of the conventional optical apparatus described in the foregoing. In accordance with the arrangement of the first embodiment, therefore, the light quantity control can be carried out without causing any image deterioration for objects of shooting, except when the object luminances is at an unimaginably high level.

Second Embodiment

In the case of a second embodiment of the invention, an optical apparatus which is similar to the one described as the first embodiment is composed of a camera body and an interchangeable lens. Particularly, a variable density element is disposed on the side of the interchangeable lens.

Figure 13:
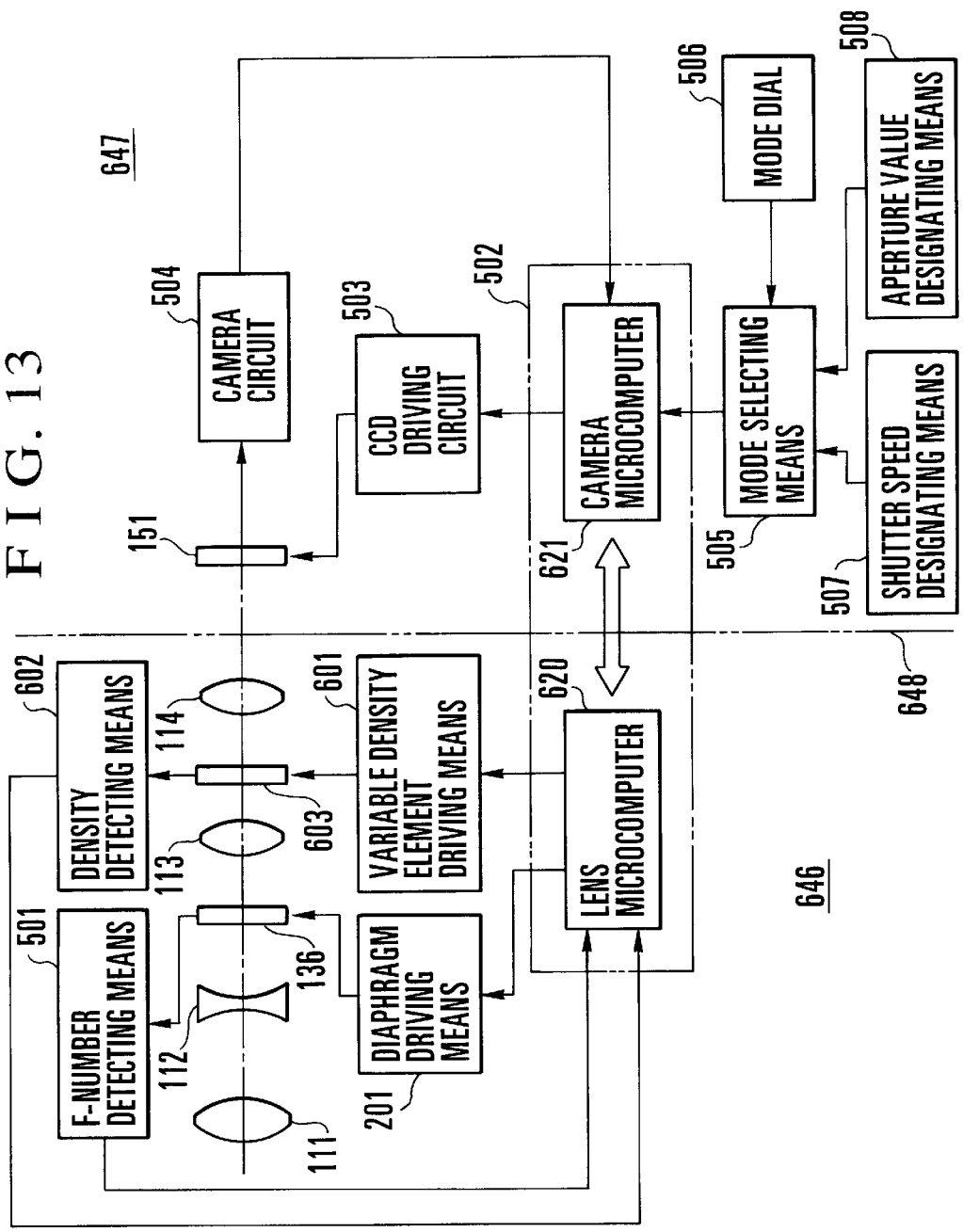
FIG. 13 is a block diagram showing an optical apparatus according to a second embodiment of the invention.

FIG. 13 is a block diagram showing the arrangement of the optical apparatus according to the second embodiment. In FIG. 13, a lens unit 646 is shown on the left side of a two-dot chain line 648, and a camera body 647 is shown on the right side of the two-dot chain line 648. All the blocks that have the same functions as those of the corresponding blocks of FIG. 1 are denoted by the same reference numerals as in FIG. 1. In the second embodiment, the CPU 502 shown in FIG. 1 is replaced with a lens microcomputer 620 and a camera microcomputer 621. These two microcomputers 620 and 621 are provided with a communication path for communicating information between them through mount contacts which are arranged in a known manner.

Figure 14:
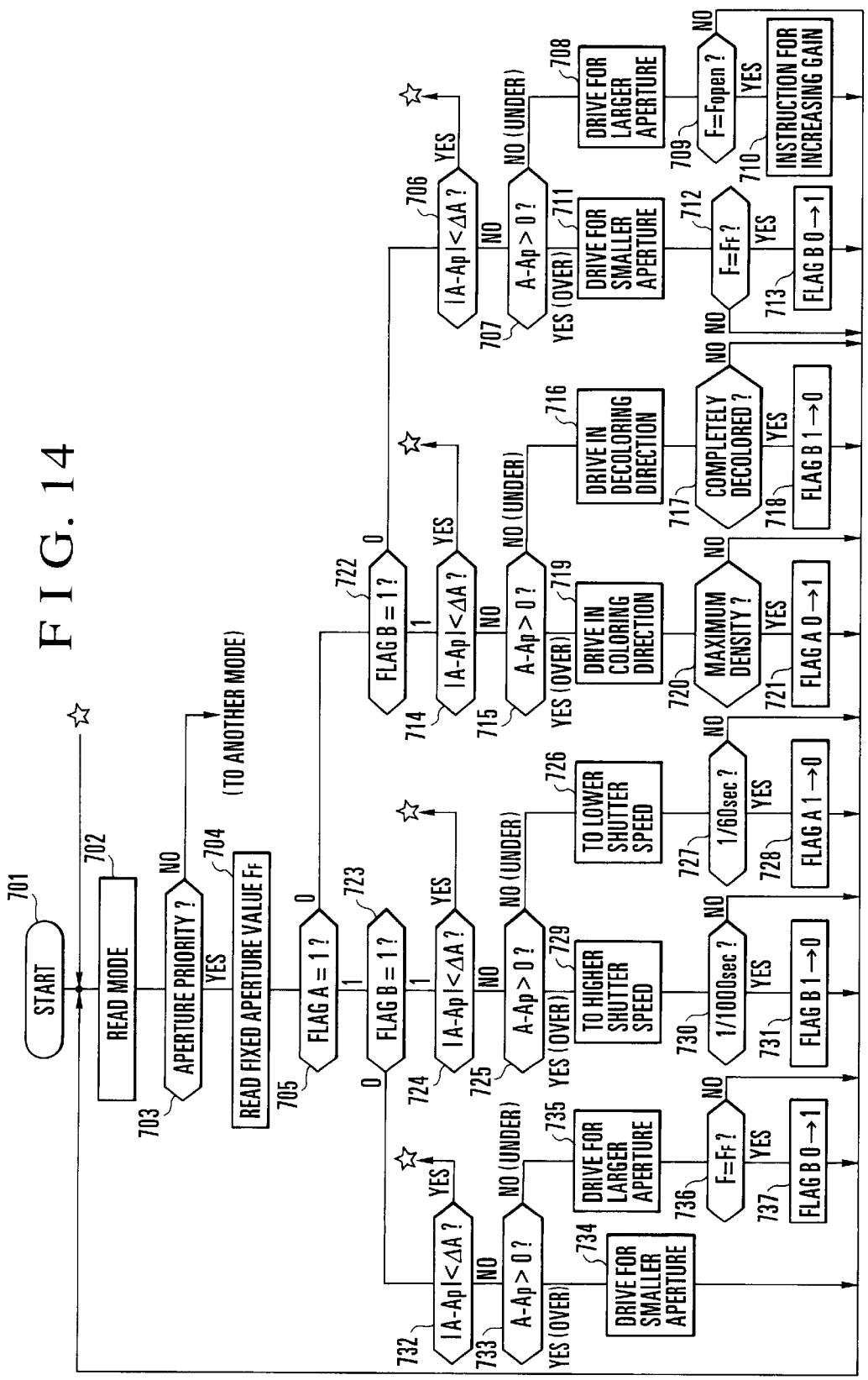
FIG. 14 is a flow chart for explaining the light quantity control performed in the first and second embodiments.

FIG. 14 is a flow chart showing in detail the light quantity control operation of the CPU 502 in the first embodiment shown in FIG. 1 or that of the camera microcomputer 621 or the lens microcomputer 620 in the second embodiment shown in FIG. 13. Referring to FIG. 14, the flow of operation starts at a step 701. At a step 702, a mode selected by the mode dial 506 from among the various modes, such as an aperture priority mode, a shutter-speed priority mode and the above-stated portrait, sport and normal modes, is set.

At a step 703, a check is made for the selected mode. If the aperture priority mode is found to have been selected and read, the flow proceeds to a step 704. At the step 704, a fixed aperture value, i.e., an aperture value set by the operator when the aperture priority mode is selected is read in. In the flow chart, the fixed aperture value is indicated as $F_F$. In the case of the program diagram of FIG. 4 described in the foregoing, the value $F_F$ is F5.6. In the flow chart, three discrimination steps 705, 722 and 723 are provided for selecting three light quantity control means, i.e., the diaphragm unit 136, the variable density element 603 and the shutter speed, by using flags A and B. The discrimination is made as shown in Table 1 below:

TABLE 1

| light quantity control means | flag A | flag B |
| --- | --- | --- |
| diaphragm unit (for low illuminance) | 0 | 0 |
| variable density element | 0 | 1 |
| shutter speed | 1 | 1 |
| diaphragm unit (for high illuminance) | 1 | 0 |

For example, within an exposure value range from EV7 to EV11 of the example shown in FIG. 4, the light quantity control is carried out by having the aperture position of the diaphragm unit 136 between F1.4 (full open) and F5.6. This range is indicated with the flag A at "0" and the flag B also at "0". Within the range from EV11 to EV14, the light quantity control is carried out by controlling the density of the variable density element 603. This range is indicated with the flag A at "0" and the flag B at "1". For a range within which the light quantity control is to be carried out by controlling the shutter speed, both the flags A and B are at "1". In the case of a brighter illuminance (at EV18 or above, in the case of FIG. 4), the aperture position of the diaphragm unit 136 is again controlled and adjusted to a smaller aperture position than F5.6. This range is indicated with the flag A at "1" and the flag B at "0".

If the flag A is at "0" and the flag B at "0", the result of a check made at the step 722 becomes "NO" (flag B=0), and the flow proceeds to a step 706. At the step 706, a check is made for a condition of "|A−Ap|<ΔA", wherein "A" represents the luminance level of a predetermined light measuring area in a video signal obtained by the CCD 151, "Ap" represents a reference luminance level which is to be obtained with the light quantity adjusted in an optimum manner, and "ΔA" represents a very small value set for a dead zone. Therefore, if the result of the check made at the step 706 is "YES", this indicates that a luminance level currently obtained approximately coincides with the reference level Ap (within the range of the dead zone ΔA). Therefore, in that case, the flow of operation returns to the start as it is not necessary to vary the currently set condition of the light quantity adjusting means.

If the result of the check made at the step 706 is "NO", thus indicating an in apposite light quantity, the flow proceeds to a step 707. At the step 707, a check is made for the negative or positive sign of the value "A−Ap". In the case of "A−Ap>0", the luminance level is higher than the reference level to indicate the so-called over-exposure state. In the opposite case, the luminance level indicates the so-called under-exposure state. The checks made in the above manner at the steps 706 and 707 are made in exactly the same manner at steps 714 and 715, at steps 724 and 725 and at steps 732 and 733. If the result of the check made at the step 707 indicates the under-exposure state, the flow proceeds to a step 708 to drive the diaphragm unit 136 toward a larger aperture diameter position (in the direction of opening the aperture). At a step 709, a check is made to find if the diaphragm unit 136 has reached its maximum aperture position. If not, the flow returns to the start to repeat the above-stated steps until the result of the check made at the step 706 becomes "YES" (indicating an optimum light quantity). In repeating these steps, when the result of the check made at the step 709 becomes "YES", indicating arrival of the diaphragm unit 136 at the maximum aperture position, the flow proceeds to a step 710. At the step 710, an instruction is given to increase the gain of the CCD 151.

When the result of the check made at the step 707 is "YES", indicating the over-exposure state, the flow proceeds to a step 711. At the step 711, the diaphragm unit 136 is driven in the direction of making its aperture smaller (in the direction of closing its aperture). At a step 712, a check is made to find if the aperture of the diaphragm unit 136 has been stopped down up to the position of the fixed aperture value $F_F$ ($F_F$=F5.6). If not, the flow returns to the start. If the current light quantity still remains in the over-exposure state despite reaching the fixed aperture value $F_F$, the flow proceeds to a step 713 to change the flag B from "0" to "1" before returning to the start. As a result, the flag A is set at "0" and the flag B is set at "1". The flow, therefore, proceeds from the step 722 to steps 714 and 715. The result of a check made at the step 715 becomes "YES" if the light quantity under control is in the over-exposure state. If so, the flow proceeds to a step 719. At the step 719, the variable density element 603 is controlled to vary its density in the coloring direction. At a step 720, a check is made to find if the result of the process of the step 719 has reached a maximum density set within a safe range of not bringing about any problem in respect of spectral transmission characteristic. If so, the flow proceeds to a step 721 to change the flag A from "0" to "1". If the result of the check made at the step 715 is "NO", indicating the under-exposure state, the flow proceeds to a step 716. At the step 716, the variable density element 603 is driven in the decoloring direction. At a step 717, a check is made to find if a completely decolored state is reached in the variable density element 603. If so, the flow proceeds to a step 718 to change the flag B from "1" to "0". Therefore, if the under-exposure state still exists despite the completely decolored state, the flow proceeds again to the step 706 to control the diaphragm unit 136.

With the aperture set at the fixed aperture value $F_F$ and the maximum density attained, if the over-exposure state still exists there, both the flags A and B become "1" as a result of the step 721 whereby the flag A is changed from "0" to "1". In that case, the flow proceeds to the step 724 in the next cycle of flow. The control processes after the step 724 are performed to control the electric charge storing time of the CCD 151, i.e., the shutter time. The control is then performed to vary the electric charge storing time according to the over-exposure or under-exposure state in the same manner as described above.

In this instance, the light quantity control is assumed to be carried out by adjusting the shutter speed within a range from 1/60 sec to 1/1000 sec. Then, at each of steps 727 and 730, a check is made to find if the shutter speed has reached one end of this range. After that, for a high illuminance object, the flow proceeds to a step 731. At the step 731, the flag B is changed from "1" to "0" for the purpose of performing, in the next cycle of flow, the light quantity control by means of the diaphragm unit 136. In a case where the under-exposure state still remains even at the shutter speed of 1/60 sec, the flow proceeds to a step 728. At the step 728, the flag A is changed from "1" to "0" for the purpose of performing in the next cycle the light quantity control by decoloring the density of the variable density element 603. In the next cycle of flow, when the flag A becomes "1" and the flag B becomes "0", the flow proceeds to a step 732 as a result of a check made at the step 723. After the step 732, the diaphragm unit 136 is controlled at the steps 734, 735 and 736. This process of control is to be performed within a range of aperture diameters smaller than the fixed aperture value $F_F$. Therefore, if the result of a check made at the step 736 for the fixed aperture value $F_F$ ($F=F_F$) becomes "YES", the flow proceeds to a step 737 to change the flag B from "0" to "1", so that the light quantity control can be performed by controlling the shutter speed in the next cycle of the flow.

The flow of operation described above is based on the program diagram of FIG. 4, whereby the light quantity control is to be performed in the mode of giving priority to the fixed aperture ($F=F_F$) According to the flow of operation, if no apposite exposure amount is obtainable under the condition of $F=F_F$, an optimum light quantity is obtained by easing this condition.

Fundamentally, the flow of operation shown in FIG. 14 is changeable as desired for various modes. For example, the sequence of use of the light quantity control means when the state of object illuminance varies from a dark state to a bright state may be changed or, in the case of the aperture priority mode, the use of the conditions of "flags A and B=0, 0" and "flags A and B=1, 0" shown in Table 1 may be inhibited.

In the case of an interchangeable lens, the CPU is made to be composed of the lens microcomputer 620 and the camera microcomputer 621, as shown in FIG. 13. In that case, with one of these microcomputers arranged to operate according to the flow chart of FIG. 14, it is necessary to allow them to intercommunicate information on the state of each of the light quantity control means through a communication route in executing the procedures set forth in the flow chart.

For example, in a case where the light quantity control is to be performed by the lens microcomputer 620, information on the exposure value EV, the current shutter speed, etc., must be transmitted through communication from the camera microcomputer 621 to the lens microcomputer 620. Conversely, an instruction for changing the shutter speed is to be transmitted from the lens microcomputer 620 to the camera microcomputer 621.

If the flow of control operation shown in FIG. 14 is to be executed by the camera microcomputer 621 instead of the lens microcomputer 620, it is necessary to communicate information on the states of the diaphragm unit 136 and the variable density element 603 from the lens microcomputer 620 to the camera microcomputer 621.

It is also conceivable to have the flow of operation of FIG. 14 shared by the microcomputers 620 and 621 by arranging the light quantity control means of the camera body or the lens unit to be operated or locked by communicating information between these microcomputers.

Third Embodiment

In the second embodiment described above, the variable density element 603 is disposed on the side of the interchangeable lens which is detachably mounted on the camera body. However, since the variable density element 603 is capable of controlling the quantity of transmission light, the location where the variable density element 603 can be disposed is not limited, unlike the diaphragm unit 136 which must be disposed in a pupil position. Therefore, the variable density element 603 can be disposed on the side of the camera body immediately before a solid-state image sensor such as a CCD.

The arrangement of having the variable density element 603 disposed on the side of the camera body as mentioned above gives an advantage that the variable density element 603 does not have to be disposed within each of interchangeable lenses.

Figure 15:
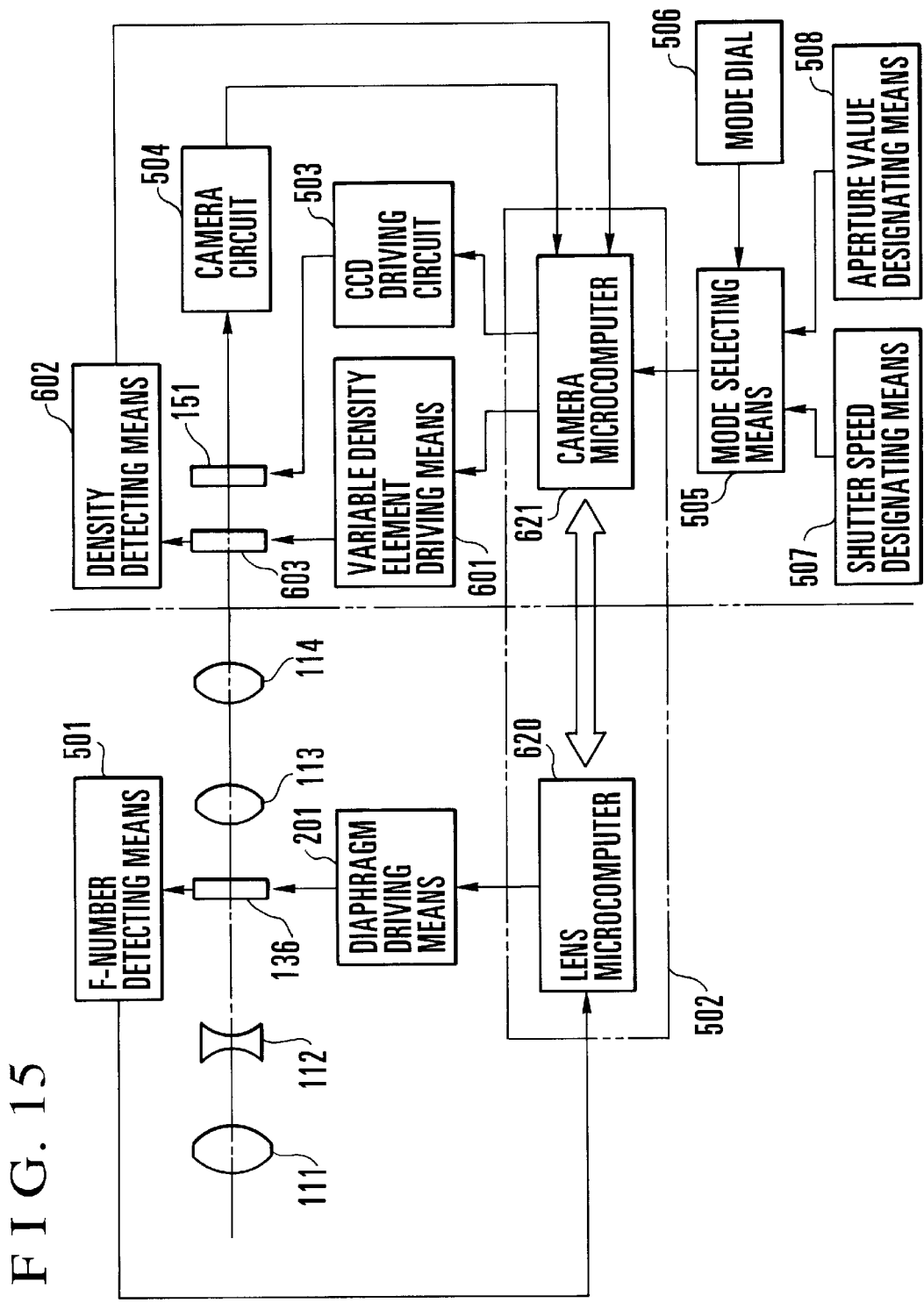
FIG. 15 is a block diagram showing an optical apparatus according to a third embodiment of the invention.

FIG. 15 is a block diagram showing the arrangement of an optical apparatus according to a third embodiment of the invention. In the case of the third embodiment, unlike in the second embodiment shown in FIG. 13, the variable density element 603 is disposed on the side of the camera body as mentioned above.

As in FIG. 13, FIG. 15 shows the lens unit on the left side of a two-dot chain line and the camera body on the right side of the two-dot chain line. As shown in FIG. 15, the variable density element 603 is disposed on the side of the camera body.

Fourth Embodiment

For each of the embodiments disclosed above, the variable density element 603 must be designed to cover a whole effective light flux obtainable with the diaphragm opened to its maximum aperture position. However, the arrangement of covering the whole effective light flux results in a slower response speed or a higher cost than arranging the variable density element to cover a smaller area.

A fourth embodiment of the invention is arranged to be suitable for a case where a program diagram to be selected according to an image-taking mode does not include any situation that necessitates the density of the variable density element 603 to be varied with apertures within an aperture range of the diaphragm, for example, between its maximum aperture and F5.6, or to be suitable for a camera having only a standard program diagram including no mode selecting action, like the program diagram shown in FIG. 6. The fourth embodiment is thus arranged to use the variable density element 603 solely for preventing deterioration of images due to diffraction. The light quantity control to be performed in the manner as shown in FIG. 6 in the fourth embodiment is described as follows.

Figure 8:
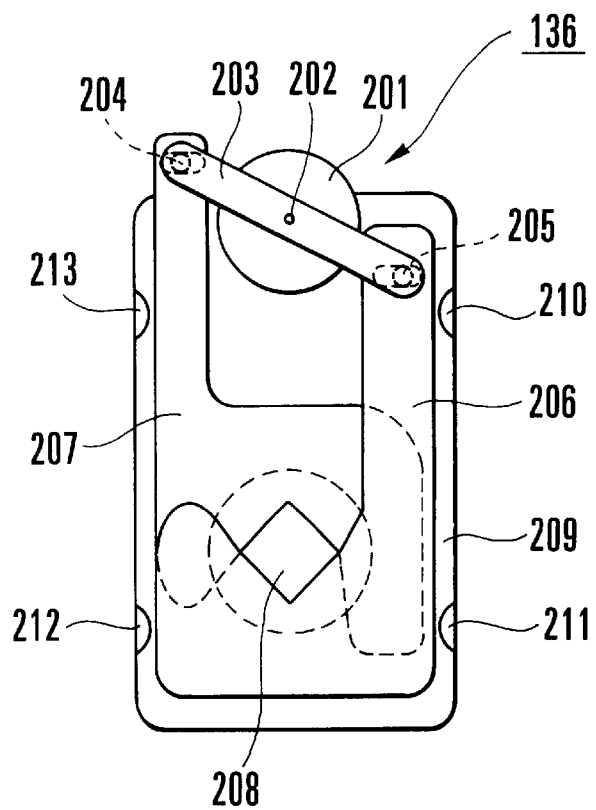
FIG. 8 shows the arrangement of a diaphragm unit used in the conventional optical apparatus.
Figure 9:
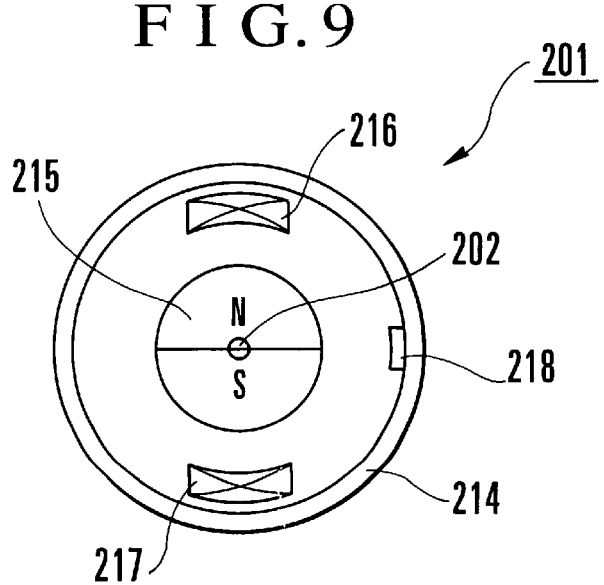
FIG. 9 shows in detail the arrangement of a driving part of the diaphragm unit.
Figure 10A:
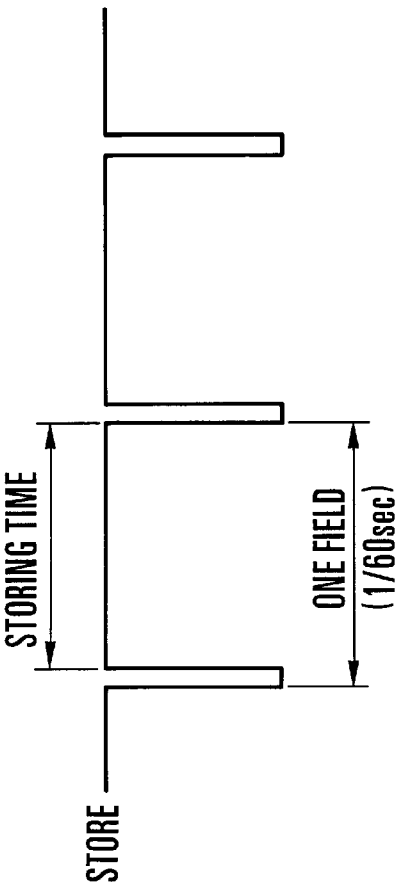
FIGS. 10(a) and 10(b) are charts for explaining control over the electric charge storing time of a CCD.
Figure 10B:
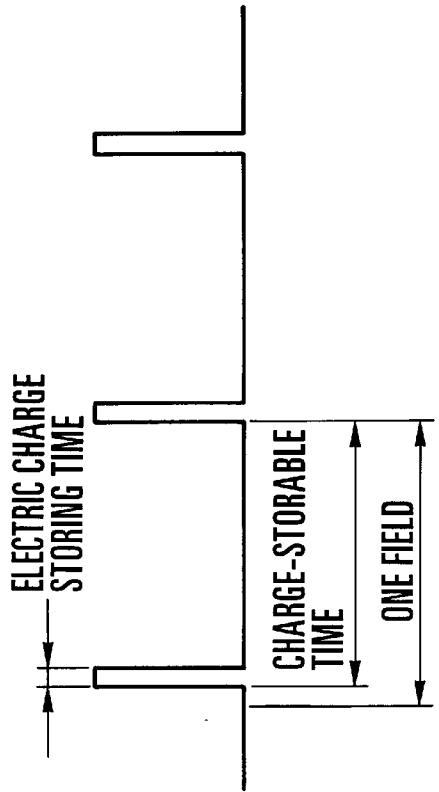
Figure 16:
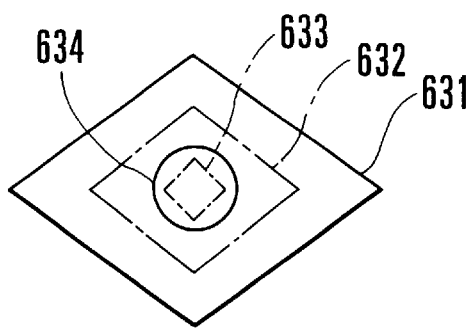
FIG. 16 shows a dimensional relation between a variable density range and the shape of a diaphragm aperture in the fourth embodiment.

FIG. 16 shows a density varying range in relation to the shape of a diaphragm aperture in respect of mechanical dimensions in the fourth embodiment. In FIG. 16, reference numeral 631 denotes the full-open shape of the aperture part of the diaphragm unit 136 composed of two diaphragm blades as shown in FIGS. 8 and 9. The F-number of the full-open (maximum) aperture is assumed to be, for example, F1.4. Reference numeral 632 denotes the aperture shape obtained by stopping the aperture, for example, down to F4. Reference numeral 633 denotes the aperture shape obtained by stopping the aperture, for example, down to F8. The light quantity control method employed by the fourth embodiment is as shown in FIG. 6. According to this method, after the aperture is stopped down to F8 as represented by the shape 633 in FIG. 16, the process of the light quantity control shifts to a process of controlling the density of the variable density element 603, if the amount of exposure still remains in the over-exposure state. Thus, the density varying area of the variable density element 603 may be set in an area where the aperture shape 633 can be adequately covered. Therefore, the density varying area is set at a circular range 634 as shown in FIG. 16.

With the setting of the density varying area of the variable density element 603 made as mentioned above, the light quantity control can be accomplished fundamentally in the manner as shown in the flow chart of FIG. 14. In the case of the fourth embodiment, however, the fixed aperture value $F_F$, is set at F8, and the steps 702, 703 and 704 of the flow chart of FIG. 14 are not necessary.

Figure 17:
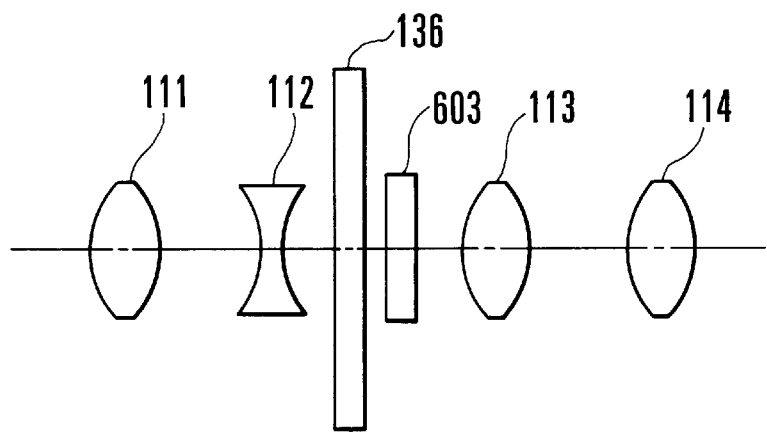
FIG. 17 shows the location of a variable density element in the fourth embodiment.

Further, the variable density element 603 which is arranged as described above is preferably arranged as near to the diaphragm unit 136 as possible and arranged to have, in that position, the effective light flux diameter about equal to an effective light flux diameter determined by the position of the diaphragm unit 136, as shown in FIG. 17. In FIG. 17 which shows such positional arrangement, reference numerals 111 to 114 denote lens groups similar to the lens groups described in the foregoing. Reference numeral 136 denotes the diaphragm unit. The variable density element 603 is disposed close to the diaphragm unit 136 on its side facing an image forming plane. Further, the diaphragm unit 136 and the variable density element 603 may be disposed conversely to their positional relation shown in FIG. 17.

Figure 18:
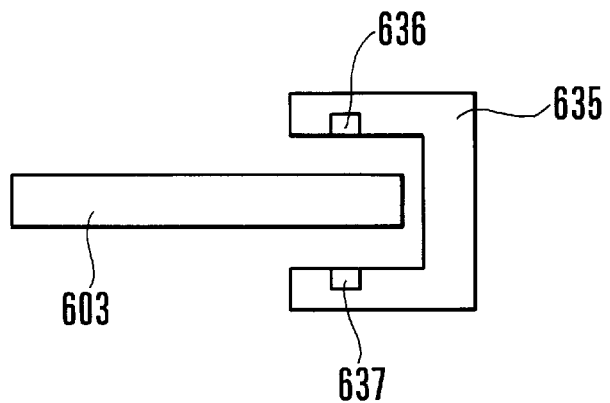
FIG. 18 shows the method of detecting the density of the variable density element.

FIG. 18 shows by way of example a method for detecting the density of the variable density element 603. The illustration includes the variable density element 603, a light emitting element 636 such as an IRED or the like, a light receiving element 637, and a U-shaped member 635 for holding the light emitting and receiving elements 636 and 637. The density of the variable density element 603 can be detected through the output of the light receiving element 637.

Fifth Embodiment

In each of the embodiments described above, one variable density element is used and the density of the variable density element is arranged to be variable by three steps. In the case of a fifth embodiment of the invention, a plurality of variable density elements are arranged, for example, as a first variable element, a second variable element and so forth, to permit adjustment of density over a wider range than in the case of using only one variable density element.

Further, the use of a plurality of variable density elements makes it possible to follow changes taking place in object luminance over a wide range, even if no other light quantity control means, such as a diaphragm unit or a shutter operating speed, is used.

Sixth Embodiment

Figure 19:
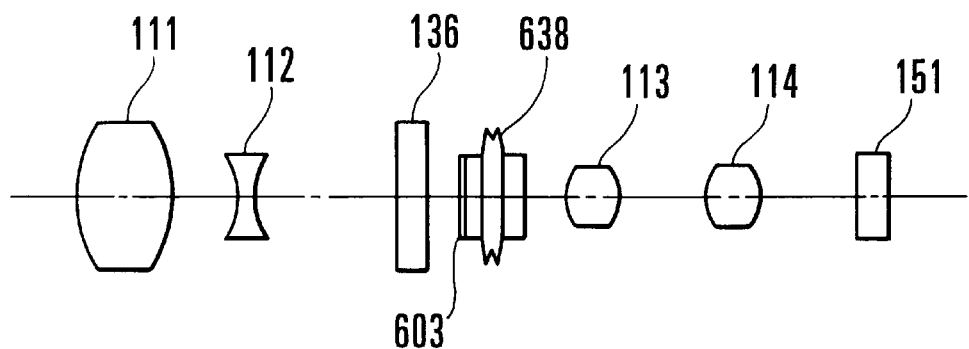
FIG. 19 shows the location of a variable density element in a sixth embodiment of the invention.

The arrangement of a sixth embodiment of the invention is directed to a zoom lens having a variable angle prism which is used for the image shake correcting means of an image shake correcting device disposed within the optical path of the zoom lens, and a glass surface of the variable angle prism is used also as the variable density element, as shown in FIG. 19.

Referring to FIG. 19, a variable angle prism 638 is diposed in rear of the diaphragm unit 136. In the variable angle prism 638, a glass surface on the side close to the diaphragm unit 136 is made to serve as the variable density element 603.

Figure 20:
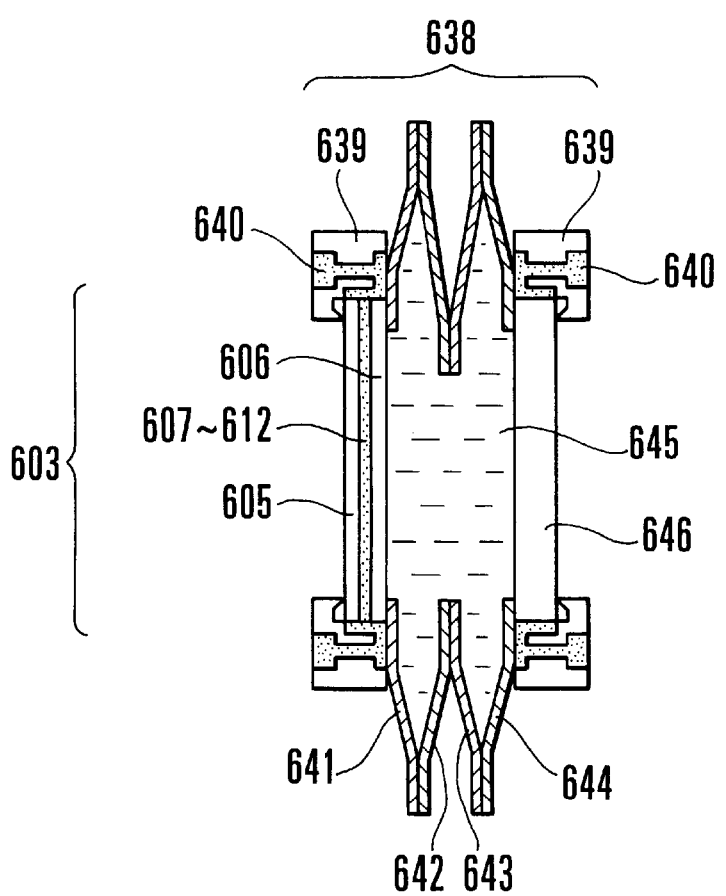
FIG. 20 shows the structure of a variable angle prism in the sixth embodiment.

FIG. 20 shows in detail the arrangement of the variable angle prism 638 having the above structure. Referring to FIG. 20, a liquid 645 is sealed inside a bellows part which is composed of a flat glass plate 646, the variable density element 603 and four doughnut-shaped films 641 to 644. Each of the variable density element 603 and the flat glass plate 646 is bonded to a frame which is composed of frame parts 639 and 640. A film surface material which forms the bellows is the same as the material of the frame 640 to allow the bellows and the frame to be secured to each other by welding. The films 641 and 644 are disposed between the glass surface 606 of the variable density element 603 and the flat glass plate 646 and may be bonded respectively to the glass surface 606 and the flat glass plate 646.

What is claimed is:

1. An optical apparatus comprising:

a) a light quantity adjusting device for adjusting the quantity of passing light by moving diaphragm blades;

b) a variable angle prism; and a variable density element, said variable density element is provided on one of two glass surfaces of said variable angle prism located closer to said light quantity adjusting device than the other glass surface, wherein said variable density element causes to vary density according to the applied voltage and causes to vary the quantity of passing light which passes through itself.

2. An optical apparatus according to claim 1, wherein said optical apparatus is composed of a camera and an interchangeable lens, and said variable density element is disposed in said interchangeable lens.

3. An optical apparatus according to claim 1, further comprising:

selecting means for selecting one image-taking mode from among a plurality of image-taking modes; and density control means for controlling the voltage applied to said variable density element and controlling the density of said variable density element, wherein said density control means is capable of controlling the density of said variable density element in a plurality of density control modes and selects one of the plurality of density control modes according to the image-taking mode selected by said selecting means.

4. An optical apparatus capable of performing an image-taking operation in a plurality of image-taking modes, said optical apparatus comprising:

selecting means for selecting one image-taking mode from among a plurality of image-taking modes;

light quantity adjusting means for adjusting the quantity of passing light by moving diaphragm blades in a plurality of light quantity adjusting modes;

a variable angle prism;

a variable density element, said variable density element is provided on one of two glass surfaces of said variable angle prism located closer to said light quantity adjusting means than the other glass surface, said variable density element causes to vary density according to the applied voltage and causes to vary the quantity of passing light which passes through itself;

density control means for controlling the voltage applied to said variable density element and controlling the density of said variable density element in a plurality of density control modes; and deciding means for deciding a combination of the density control mode of said density control means and the light quantity adjusting mode of said light quantity adjusting means according to the image-taking mode selected by said selecting means.

5. An optical apparatus according to claim 4, wherein said optical apparatus is composed of a camera and an interchangeable lens, and said variable density element is disposed in said interchangeable lens.

6. An optical apparatus according to claim 4, wherein the plurality of light quantity adjusting modes of said light quantity adjusting means include a first light quantity adjusting mode in which said diaphragm blades are moved according to an object luminance and a second light quantity adjusting mode in which said diaphragm blades are moved to a desired position irrespective of the object luminance, and one of the first light quantity adjusting mode and the second light quantity adjusting mode is selected according to the image-taking mode selected by said selecting means.

\* \* \* \* \*

UNITED STATES PATENT AND TRADEMARK OFFICE
CERTIFICATE OF CORRECTION

PATENT NO. : 6,720,995 B1 Page 1 of 1
DATED : April 13, 2004
INVENTOR(S) : Naova Kaneda et al.

It is certified that error appears in the above-identified patent and that said Letters Patent is hereby corrected as shown below:

<u>Column 13,</u>
Line 14, delete "a variable" and insert -- c) a variable --.

Signed and Sealed this

Twenty-eighth Day of March, 2006

JON W. DUDAS
*Director of the United States Patent and Trademark Office*